(12) United States Patent
Jo et al.

(10) Patent No.: US 12,469,579 B2
(45) Date of Patent: Nov. 11, 2025

(54) SEMICONDUCTOR TEST APPARATUS CAPABLE OF INDUCING REDUCTION OF POWER CONSUMPTION

(71) Applicant: YC Corporation, Seongnam-si (KR)

(72) Inventors: Hyo Sang Jo, Uiwang-si (KR); Wan Soon Park, Yongin-si (KR); Yong Hyun Kim, Seoul (KR); Jae Hoon Joo, Yongin-si (KR)

(73) Assignee: YC Corporation, Gyeonggi-Do (KR)

( * ) Notice: Subject to any disclaimer, the term of this patent is extended or adjusted under 35 U.S.C. 154(b) by 225 days.

(21) Appl. No.: 18/335,504

(22) Filed: Jun. 15, 2023

(65) Prior Publication Data

US 2023/0420068 A1 Dec. 28, 2023

(30) Foreign Application Priority Data

Jun. 27, 2022 (KR) ........................ 10-2022-0078124

(51) Int. Cl.
*G11C 29/56* (2006.01)
*G01R 31/3193* (2006.01)

(52) U.S. Cl.
CPC ........ *G11C 29/56* (2013.01); *G01R 31/31935* (2013.01)

(58) Field of Classification Search
CPC .................................................... G11C 29/56
See application file for complete search history.

(56) References Cited

U.S. PATENT DOCUMENTS 9,589,672 B2 3/2017 Botea
2022/0084619 A1* 3/2022 Ning ...................... G11C 29/42

FOREIGN PATENT DOCUMENTS

KR 10-2007-0059953 A 6/2007

OTHER PUBLICATIONS

Notice of Allowance for Korean Application No. 10-2022-0078124 dated Mar. 19, 2025.

* cited by examiner

*Primary Examiner* — Hoai V Ho
(74) *Attorney, Agent, or Firm* — Harness, Dickey & Pierce, P.L.C.

(57) ABSTRACT

A semiconductor test apparatus is provided. The semiconductor test apparatus includes: a test management unit determining a test mode, generating a test signal in accordance with the determined test mode, and transmitting the test signal to fail memories; and one or more fail memory boards including the fail memory, which store fail signals generated as a result of a test conducted in accordance with the test signal and address information of the fail signals, wherein if the determined test mode is a first test mode, at least some of the failure memory boards are powered off.

20 Claims, 11 Drawing Sheets

SEMICONDUCTOR TEST APPARATUS CAPABLE OF INDUCING REDUCTION OF POWER CONSUMPTION

CROSS-REFERENCE TO RELATED APPLICATION

This application claims priority from Korean Patent Application No. 10-2022-0078124 filed on Jun. 27, 2022 in the Korean Intellectual Property Office, and all the benefits accruing therefrom under 35 U.S.C. 119, the contents of which in its entirety are herein incorporated by reference.

BACKGROUND

1. Field

The present disclosure relates to a semiconductor test apparatus capable of inducing the reduction of power consumption, and more particularly, to a semiconductor test apparatus capable of inducing the reduction of power consumption by powering off a fail memory unit when failure memories are not in need.

2. Description of the Related Art

A semiconductor test apparatus is an apparatus that determines whether semiconductor devices are defective by applying electrical signals to the semiconductor devices and analyzing responses to the electrical signals from the semiconductor devices. An exemplary semiconductor test apparatus is a memory test apparatus.

The memory test apparatus generates electrical signals, via a pin electronics (PE) unit, based on logic data for timings and patterns that are obtained by interpreting a user-written program to determine whether memory cells pass or fail based on their characteristics and operation, stores only failure data in fail memory unit, and calculates information for the repair of memory cells to retrieve the failure data from a redundancy unit.

The memory test apparatus receives power and operates with all its function units activated. Accordingly, research is needed into ways to apply power depending on the circumstances of a test to reduce the power consumption of a semiconductor test apparatus.

SUMMARY

Aspects of the present disclosure provide a semiconductor test apparatus capable of reducing power consumption.

Aspects of the present disclosure also provide a semiconductor test apparatus capable of powering off its functional units that are inactivated depending on the type of test mode.

Aspects of the present disclosure also provide a semiconductor test apparatus capable of powering off its functional units that are inactivated depending on the type of test target.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a semiconductor test apparatus may include: a test management unit determining a test mode, generating a test signal in accordance with the determined test mode, and transmitting the test signal to fail memories, which store fail signals generated as a result of a test conducted in accordance with the test signal and address information of the fail signals; and one or more fail memory boards including the fail memory, wherein if the determined test mode is a first test mode, at least some of the failure memory boards are powered off.

In some embodiments, the test management unit may automatically determine the test mode by analyzing a loaded test program.

In some embodiments, the test management unit may automatically determine the test mode by interpreting a user-written program.

In some embodiments, the test management unit may automatically determine the test mode by analyzing a number of instructions involving the access of the failure memory boards by the loaded test program.

In some embodiments, the first test mode may be a post-repair mode.

In some embodiments, the semiconductor test apparatus may further include: one or more alternating current (AC)-to-direct current (DC) converters (ADCs) connected to the fail memory boards; and an interface board providing a second control signal to the ADCs, wherein the ADCs power off the fail memory boards in response to the second control signal.

In some embodiments, if the determined test mode is the first test mode, the test management unit may provide a first control signal, which is associated with power for the fail memory boards, to the interface board, and the interface board may provide the second control signal to the ADCs in response to the first control signal.

In some embodiments, each of the ADCs may be connected to some of the fail memory boards, the interface board may receive the first control signal from the test management unit and provides the second control signal to all the ADCs, and each of the ADCs may power off all the fail memory boards connected thereto in response to the second control signal.

In some embodiments, the semiconductor test apparatus may further include an interface board providing a third control signal to the fail memory boards, wherein the test management unit provides a first control signal, which is for powering off the fail memory boards, to the interface board, the interface board provides the third control signal to the fail memory boards in response to the first control signal, and power for the fail memory mounted on each of the fail memory boards is cut off in response to the third control signal.

In some embodiments, the interface board may provide the third control signal to all the fail memory boards in response to the first control signal, and power for all the fail memory boards receiving the third control signal may be cut off.

According to another aspect of the present disclosure, a semiconductor test apparatus may include: a test management unit generating a test signal in accordance with a test program, transmitting the test signal to fail memories, calculating an amount of input/output (I/O) usage in connection with the execution of the test program, and determining whether to generate a fourth control signal based on the calculated amount of I/O usage; and a plurality of fail memory boards including fail memory, which include fail signals generated as a result of a test conducted in accordance with the test signal and address information of the fail signals, wherein when the fourth control signal is generated, some of the fail memory boards are powered off.

In some embodiments, the test management unit may automatically determine a number of fail memories required for the test that is proportional to the amount of I/O usage, by calculating the amount of I/O usage.

In some embodiments, the fourth control signal is associated with a number of fail memories required for the test.

In some embodiments, the semiconductor test apparatus may further include: one or more ADCs connected to the fail memory boards; and an interface board providing a second control signal to the ADCs, wherein the ADCs power off the fail memory boards in response to the second control signal.

In some embodiments, the test management unit may provide a fourth control signal, which is associated with power for the fail memory boards, to the interface board, and the interface board may provide the second control signal to the ADCs in response to the fourth control signal.

In some embodiments, each of the ADCs may be connected to some of the fail memory boards, the interface board may receive the fourth control signal from the test management unit and provides the second control signal to some of the ADCs, and each of the ADCs receiving the second control signal may power off all the fail memory boards connected thereto in response to the second control signal.

In some embodiments, the ADCs may include first and second ADCs, the first ADC may be connected to one or more fail memory boards, and the second ADC may be connected to a number of fail memory boards that is the same as, or different from, a number of fail memory boards connected to the first ADC.

In some embodiments, the semiconductor test apparatus may further include an interface board providing the third control signal to the fail memory boards, wherein each of the fail memory boards receives a third control signal and cuts off power for fail memory mounted thereon in response to the third control signal.

In some embodiments, the test management unit may provide the fourth control signal, which is associated with power for the fail memory boards, to the interface board, and the interface board may receive the fourth control signal from the test management unit and provides the third control signal to the fail memory boards.

In some embodiments, the interface board may receive the fourth control signal from the test management unit and provides the third control signal to some of the fail memory boards, and power for the fail memory boards receiving the third control signal may be cut off It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Embodiments of the present disclosure will hereinafter be described in detail with reference to the accompanying drawings. Advantages and features of the present disclosure, and methods for achieving them, will be made clear from embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the disclosure to those skilled in the art. The present disclosure is defined only by the scope of the claims.

Wherever possible, the same reference numbers will be used throughout the drawings to refer to the same or like parts even though they are depicted in different drawings. Detailed descriptions of known functions and configurations that may unnecessarily obscure the gist of the present disclosure will be omitted.

Unless otherwise defined, all terms, including technical and scientific terms, used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the singular forms "a," "an," and "the" are intended to include the plural forms as well, unless the context clearly indicates otherwise.

It will be understood that, although the terms first, second, A, B etc. may be used herein to describe various elements, these elements should not be limited by these terms. These terms are only used to distinguish one element from another. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Embodiments of the present disclosure will hereinafter be described with reference to the accompanying drawings.

Figure 1:
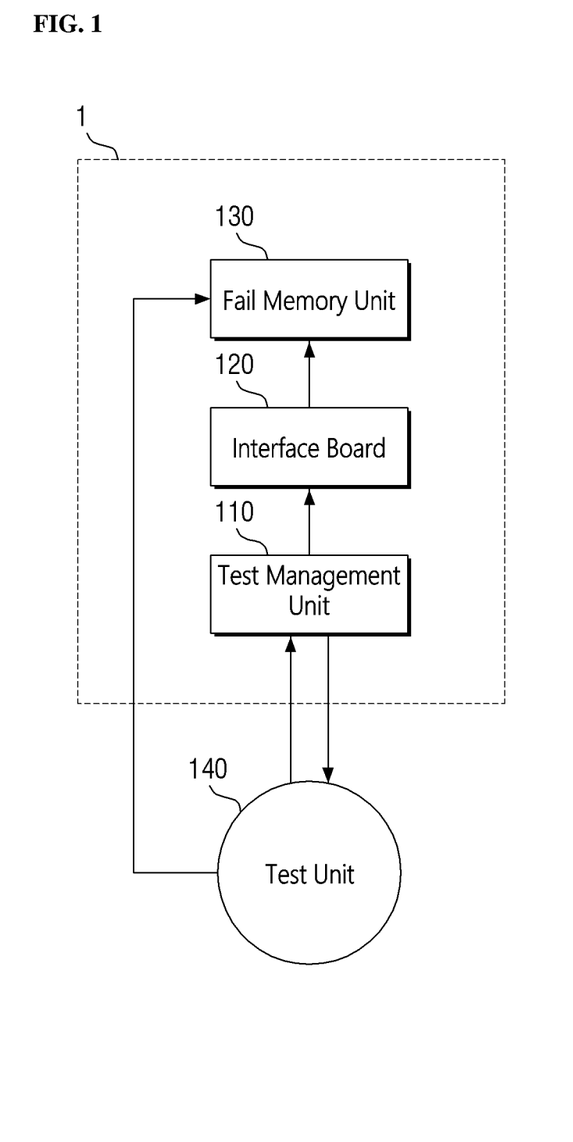
FIG. 1 is a block diagram of a semiconductor test apparatus according to an embodiment of the present disclosure.

FIG. 1 is a block diagram of a semiconductor test apparatus according to an embodiment of the present disclosure. Referring to FIG. 1, a semiconductor test apparatus 1 may include a test management unit 110, an interface board 120, and a fail memory unit 130.

In some embodiments, the test management unit 110 may generate a signal necessary for the semiconductor test apparatus 1 to perform a test operation. The generated signal necessary for a test operation may be provided to the interface board 120 and a test unit 140. The test management unit 110 may be implemented as a computing system.

In response to receipt of the signal necessary for a test operation, the interface board 110 may provide a power control signal to the fail memory unit 130. In response to receipt of the signal necessary for a test operation, the interface board 120 may provide a power-off signal for inactivated failure memories.

The test unit 140 may receive the signal necessary for a test operation and may perform a test signal based on the received signal.

Failure memories may store fail signals generated as a result of a test operation conducted by the test unit 140 and address information of the fail signals.

The test management unit 110 may automatically determine a test mode by analyzing a loaded test program. The test program may be a program for controlling a process to be performed in the test unit 140.

The test management unit 110 may automatically determine the test mode by analyzing the number of instructions involving the access of the fail memories by the test program.

Functional units of the semiconductor test apparatus 1 that are to be activated during the operation of the test unit 140 may vary depending on the test mode.

For example, a pre-repair test mode may be a mode for activating all the functional units of the semiconductor test apparatus 1. For example, a post-repair test mode may be a mode for inactivating all failure memories.

When the failure memories are inactivated, a redundancy unit, which receives data from the failure memories and performs subsequent operations, may be automatically inactivated. Also, when the failure memories are inactivated, the fail memory unit 130 may be automatically inactivated. The redundancy unit may be included in the fail memory unit 130.

If all the failure memories are to be inactivated, the test management unit 110 may provide a first control signal for powering off fail memory boards to the interface board 120.

In response to receipt of the first control signal, the interface board 120 may provide a second control signal to all alternating current (AC)-to-direct current (DC) converters (ADCs).

In response to receipt of the second control signal, the ADCs may power off all fail memory boards connected thereto.

In response to receipt of the first control signal, the interface board 120 may provide a third control signal to all the fail memory boards.

In response to receipt of the third control signal, the fail memory boards may cut off the power for failure memory mounted thereon.

The test management unit 110 may calculate the amount of input/output (I/O) usage and may automatically determine the number of failure memories needed for a test that is proportional to the amount of I/O usage.

The amount of failure memories needed for a test may be the number of failure memories required for a test target wafer. The number of failure memories required for the test target wafer may be less than the number of failure memories provided in the semiconductor test apparatus 1, and any excess failure memories of the semiconductor test apparatus 1 may be inactivated.

If some failure memories are to be inactivated, the test management unit 110 may provide a fourth control signal for powering off fail memory boards to the interface board 120.

In response to receipt of the fourth control signal, the interface board 120 may provide the second control signal to some of the ADCs.

ADCs receiving the second control signal may power off all fail memory boards connected thereto.

In response to receipt of the fourth control signal, the interface board 120 may provide the third control signal to all the fail memory boards. In response to receipt of the third control signal, the third fail memory boards may cut off the power for the failure memory mounted thereon.

Power-off operations according to some embodiments of the present disclosure will hereinafter be described with reference to FIGS. 2A through 2E.

Figure 2A:
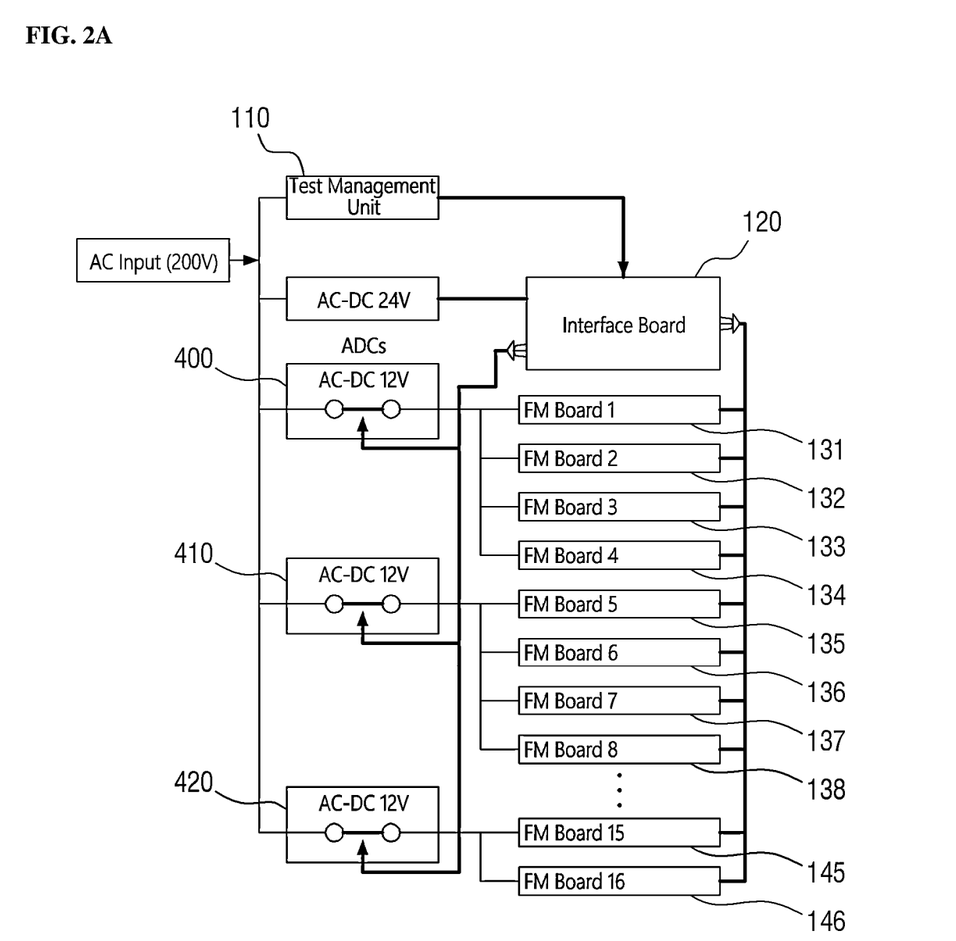
FIGS. 2A through 2G are block diagrams illustrating power off operations according to some embodiments of the present disclosure.

FIG. 2A is a power system diagram of the semiconductor test apparatus 1. Specifically, FIG. 2A is a power system diagram of the semiconductor test apparatus 1 with fail memory boards not powered off.

Referring to FIG. 2A, the test management unit 110 may provide control signals to the interface board 120, and the interface board 120 may provide the control signals to the ADCs 400, 410, and 420 and fail memory boards 131 through 138, 145, and 146.

Figure 2B:
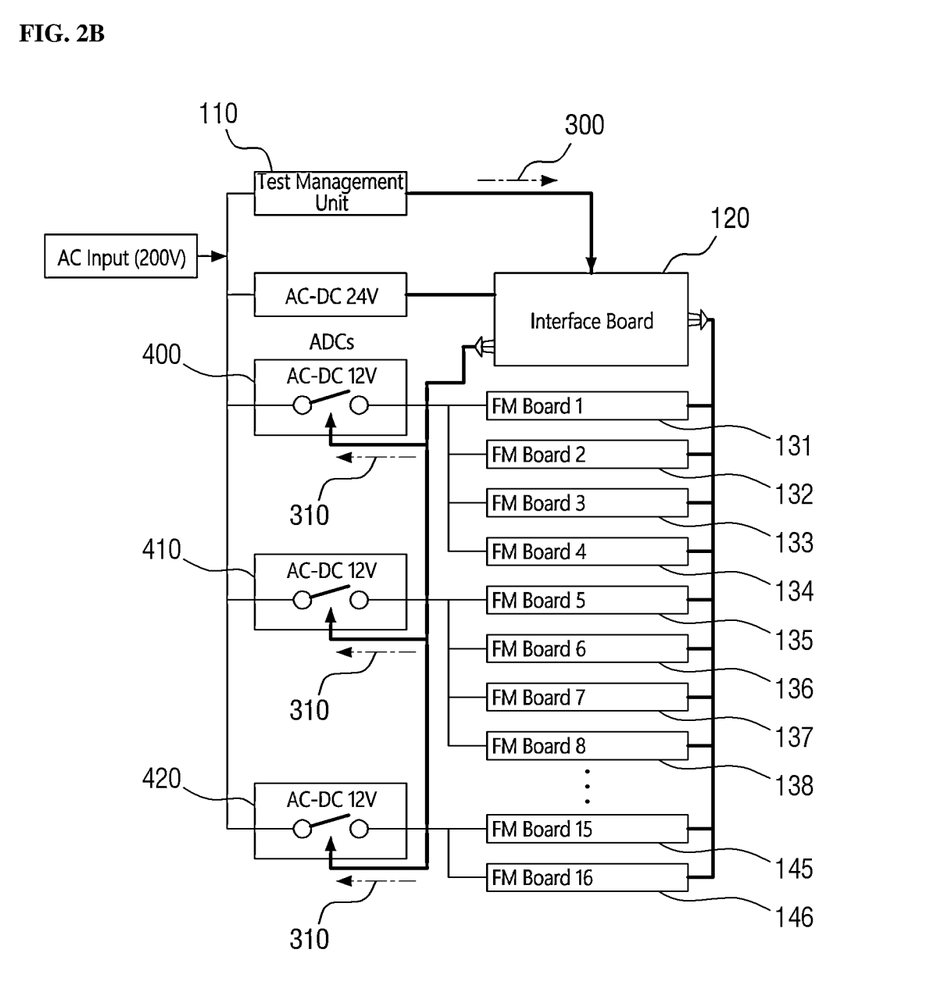

Referring to FIG. 2B, the test management unit 110 may provide a first control signal 300 to the interface board 120, and the interface board 120 may provide a second control signal 310 to the ADCs 400, 410, and 420. Then, the supply of power to the ADCs 400, 410, and 420 may be cut off, and fail memory boards connected to each of the ADCs 400, 410, and 420 may be powered off.

Figure 2C:
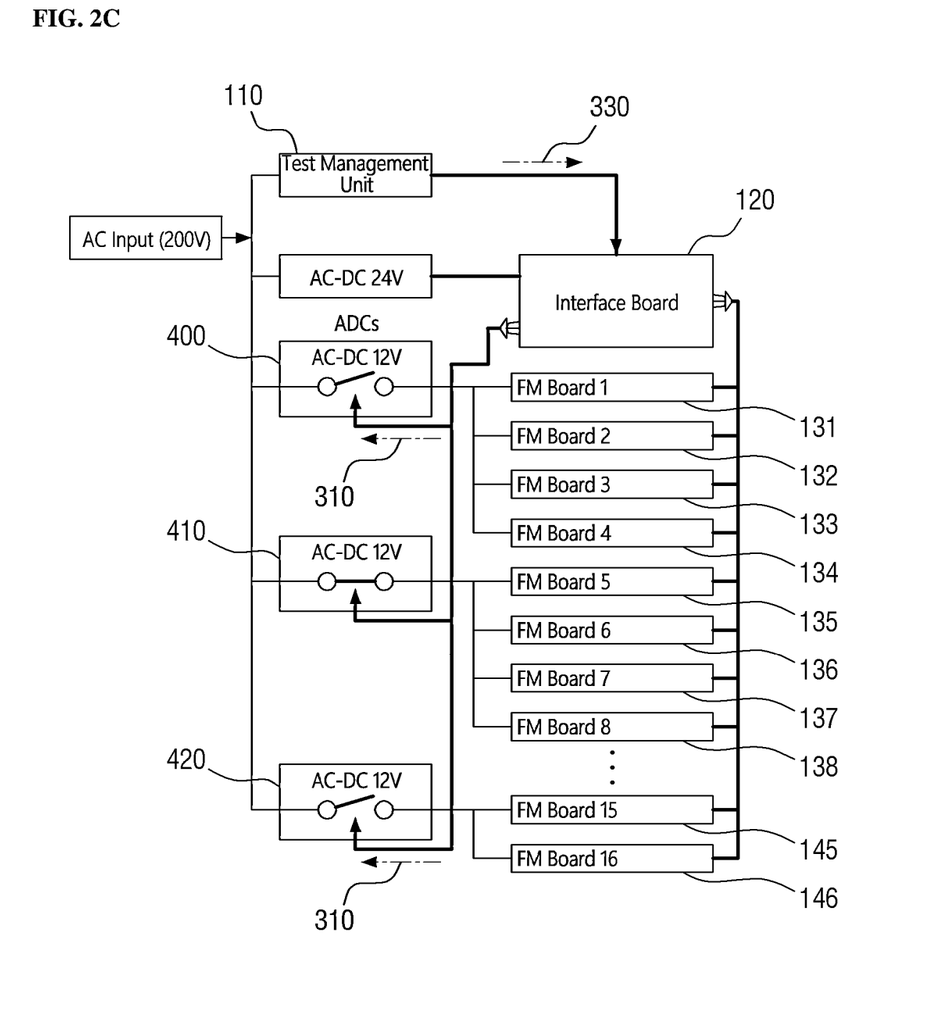

Referring to FIG. 2C, the test management unit 110 may provide a fourth control signal 330 to the interface board 120, and the interface board 120 may provide the second control 310 signal to the ADCs 400 and 420. Then, the supply of power to the ADCs 400 and 420 may be cut off, and fail memory boards connected to each of the ADCs 400 and 420 may be powered off.

If there are six more failure memories in the semiconductor test apparatus 1 than needed for a test, some of the ADCs of the semiconductor test apparatus 1, i.e., the ADCs 400 and 420, which are connected to four fail memory boards and two fail memory boards, respectively, may receive the second control signal 310.

If there are eight more failure memories in the semiconductor test apparatus 1 than needed for a test, some of the ADCs of the semiconductor test apparatus 1, i.e., the ADCs 400 and 410, which are each connected to four fail memory boards, may receive the second control signal 310.

Figure 2D:
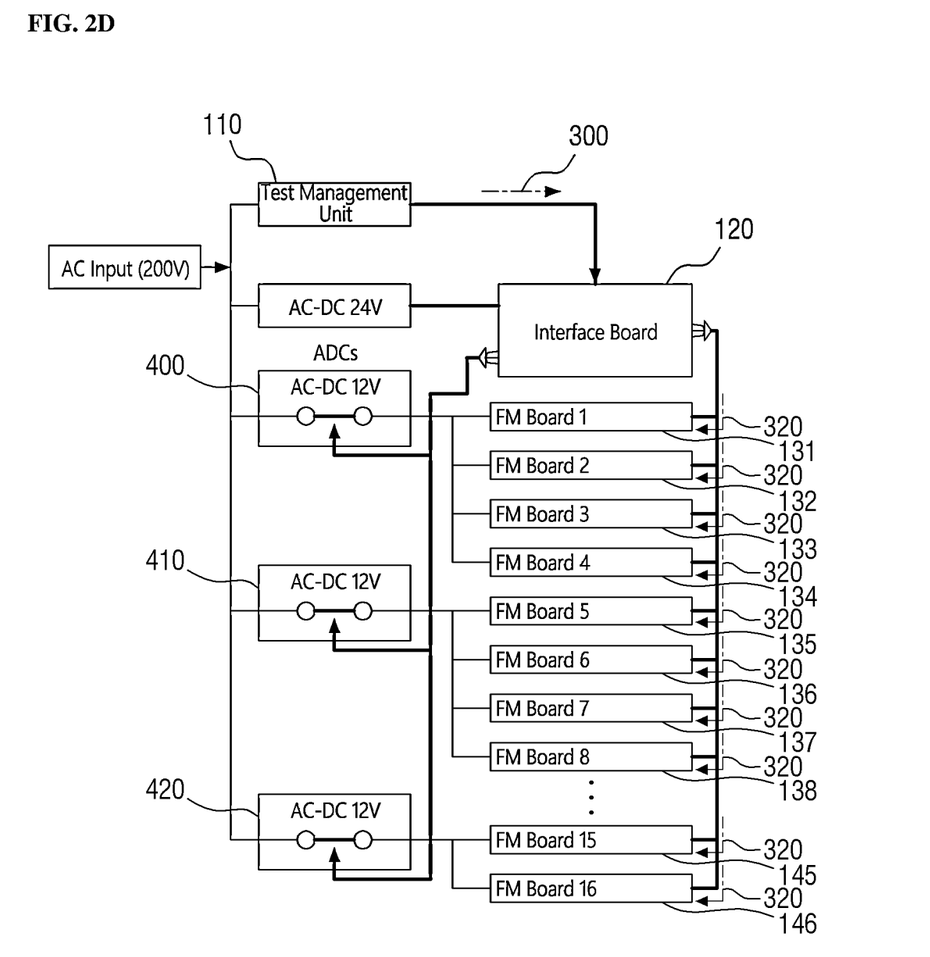

Referring to FIG. 2D, the test management unit 110 may provide the first control signal 300 to the interface board 120, and the interface board 120 may provide a third control signal 320 to the fail memory boards 131 through 138, 145, and 146. Then, the fail memory boards 131 through 138, 145, and 146 may be powered off.

Figure 2E:
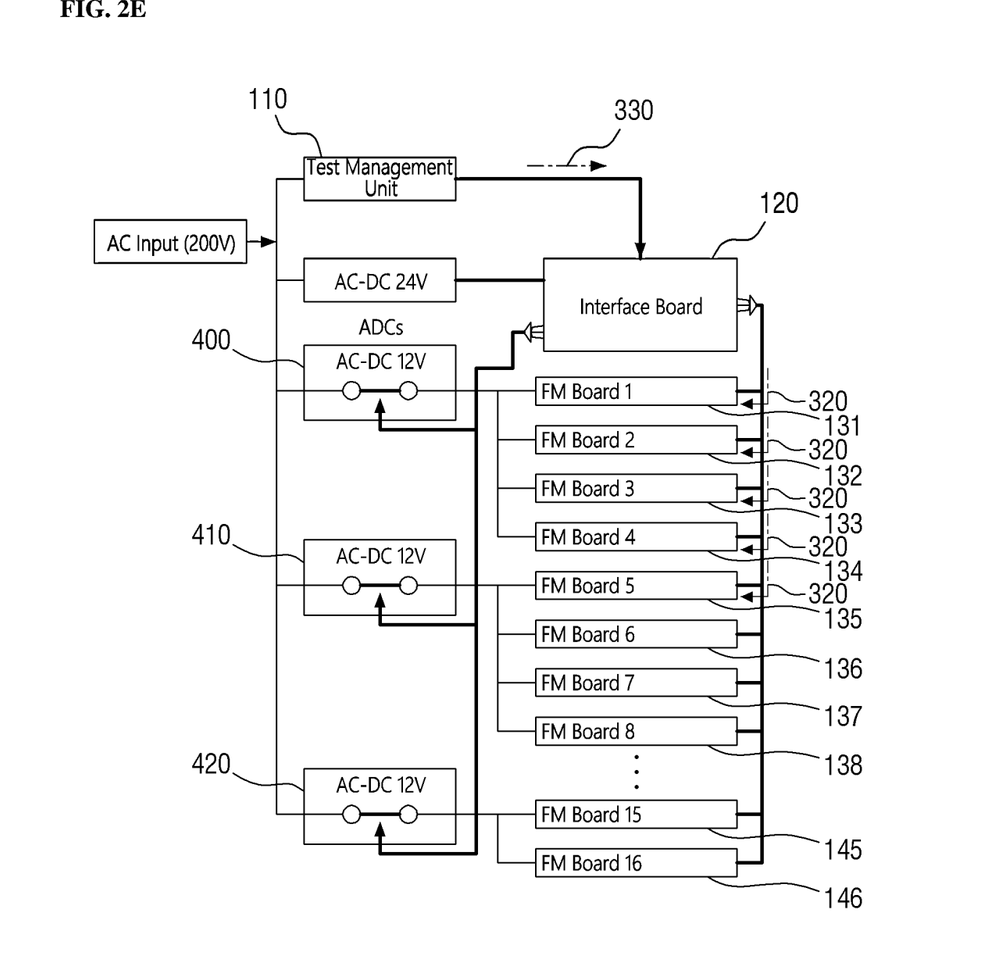

Referring to FIG. 2E, the management unit 110 may provide the fourth control signal 330 to the interface board 120, and the interface board 120 may provide the third control signal 320 to some of the fail memory boards of the semiconductor test apparatus 1, i.e., the fail memory boards 131 through 135. Then, the fail memory boards 131 through 135 may be powered off.

If there five more failure memories in the semiconductor test apparatus 1 than needed for a test, some of the fail memory boards of the semiconductor test apparatus 1, i.e., the fail memory boards 131 through 135, may receive the third control signal 320.

Figure 2F:
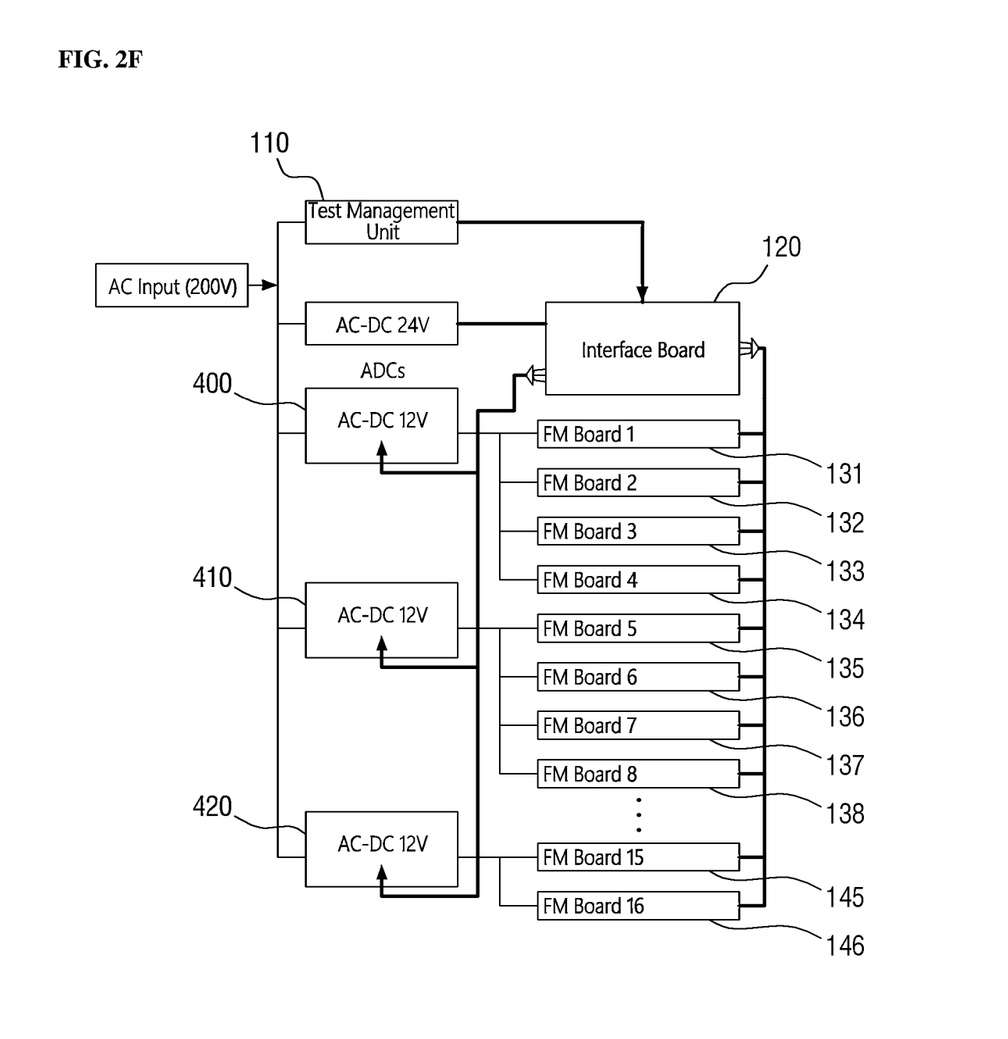

The ADCs 400, 410, and 420 may not have a power cutoff function. In this case, the interface board 120 may provide only the third control signal 320 to fail memory boards in response to the first or second control signal 300 or 310 being provided by the test management unit 110. A power system diagram of a semiconductor test apparatus 1 including ADCs with no power cutoff function is as illustrated in FIG. 2F.

Figure 2G:
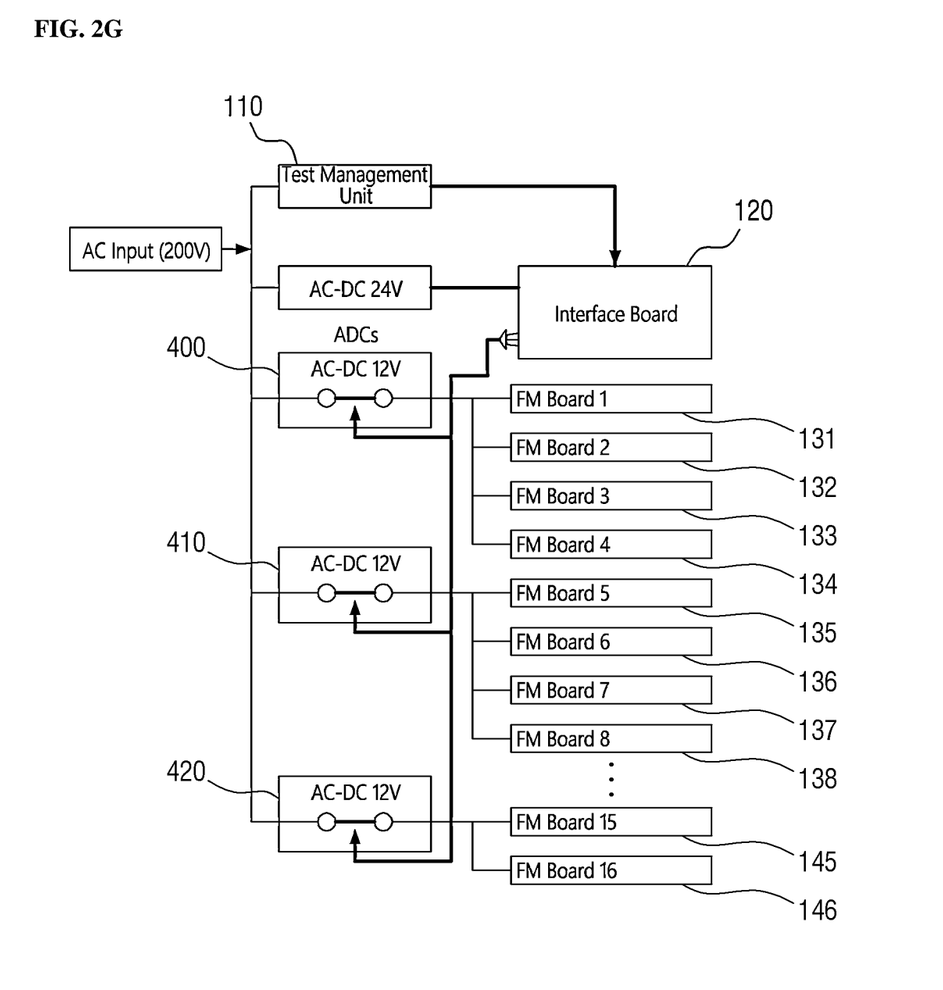

A fail memory power source may not have a power cutoff function. In this case, the interface board 120 may provide only the second control signal 310 to ADCs in response to the first or fourth control signal 300 or 330 being provided by the test management unit 110. A power system configuration of a semiconductor test apparatus 1 including a fail memory power source with no power cutoff function is as illustrated in FIG. 2, and a power cutoff operation for the fail memory power source will hereinafter be described with reference to FIGS. 3A and 3B.

Figure 3A:
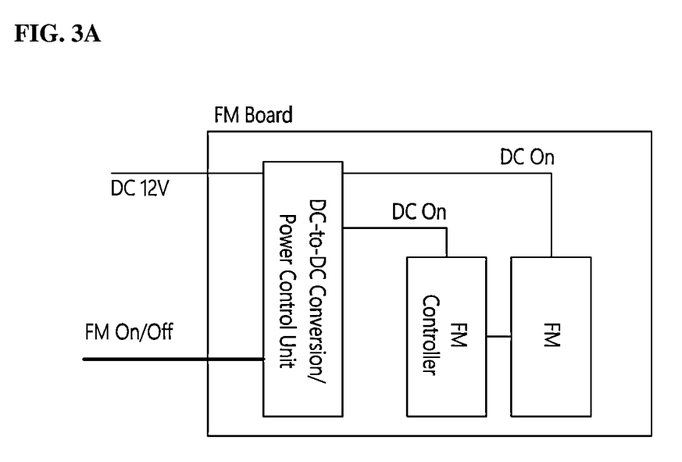
FIGS. 3A and 3B are block diagrams illustrating power structures for fail memory according to some embodiments of the present disclosure.

FIG. 3A is a power system diagram of a fail memory board not provided with the third control signal 320. Referring to FIG. 3A, the fail memory board may receive DC power from an ADC and may provide the DC power to a fail memory controller and a fail memory.

Figure 3B:
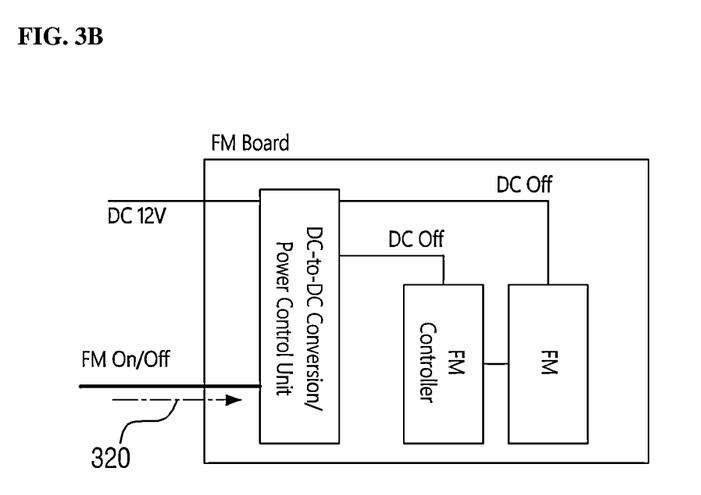

FIG. 3B is a power system diagram of a fail memory board provided with the third control signal 320. Referring to FIG. 3B, a power controller of the fail memory board may cut off DC power supplied from an external ADC to a fail memory controller and a fail memory of the fail memory board.

Figure 4:
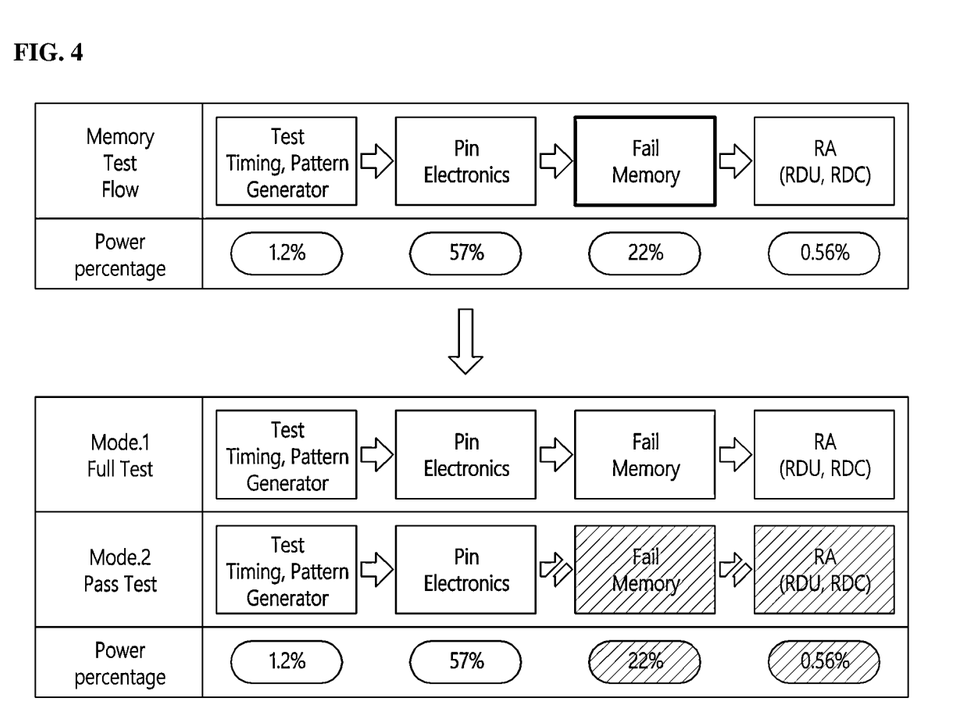
FIG. 4 shows tables for explaining the effects of some embodiments of the present disclosure.

As shown in the upper table of FIG. 4, a semiconductor test apparatus conducting a test in accordance with a conventional memory test flow applies power and operates with a test timing/pattern generator, a pin electronics (PE) unit, failure memories, and a redundancy unit all activated.

On the contrary, as shown in the lower table of FIG. 4, the semiconductor test apparatus 1 can apply power only to some of its functional units that are activated, and can operate with some of its function units inactivated, depending on the type of test mode.

For example, the test mode may be classified into a pre-repair test mode or a post-repair test mode. The semiconductor test apparatus 1 may conduct a full test as a pre-repair test, which is a test performed before the repair of fail memory cells. After the repair of fail memory cells, the semiconductor test apparatus 1 may conduct a pass test, excluding some of the procedures of the full test, as a post-repair test, which is a test conducted for checking purposes.

The semiconductor test apparatus 1 may power off at least some fail memory boards in the post-repair test mode.

As the post-repair test mode is conducted with at least some fail memory boards powered off, the power consumption of the semiconductor test apparatus 1 can be reduced by at least 20%, as shown in the lower table of FIG. 4.

According to the configuration of the semiconductor test apparatus 1, a test management unit 110 may improve a power control structure to prevent unnecessary power consumption. To this end, the determination of the test mode and the calculation of the amount of I/O usage may be required. Accordingly, target memory boards to be powered off may be provided with a power-off signal.

Embodiments of the present disclosure have been described above with reference to the accompanying drawings, but the present disclosure is not limited thereto and may be implemented in various different forms. It will be understood that the present disclosure can be implemented in other specific forms without changing the technical spirit or gist of the present disclosure. Therefore, it should be understood that the embodiments set forth herein are illustrative in all respects and not limiting.

What is claimed is:

1. A semiconductor test apparatus comprising:
   a test management unit configured to determine a test mode, generate a test signal in accordance with the determined test mode, and transmit the test signal to fail memories, the fail memories configured to store fail signals generated as a result of a test conducted in accordance with the test signal and address information of the fail signals; and
   one or more fail memory boards including the fail memories,
   wherein the test management unit is further configured to cause at least some of the fail memory boards to be powered off if the determined test mode is a first test mode.

2. The semiconductor test apparatus of claim 1, wherein the test management unit is configured to automatically determine the test mode by analyzing a loaded test program.

3. The semiconductor test apparatus of claim 2, wherein the test management unit is configured to automatically determine the test mode by interpreting a user-written program.

4. The semiconductor test apparatus of claim 1, wherein the test management unit is configured to automatically determine the test mode by analyzing a number of instructions involving an access of the fail memory boards by a loaded test program.

5. The semiconductor test apparatus of claim 1, wherein the first test mode is a post-repair mode.

6. The semiconductor test apparatus of claim 1, further comprising:
   one or more alternating current (AC)-to-direct current (DC) converters (ADCs) connected to the fail memory boards; and
   an interface board is configured to provide a second control signal to the ADCs,
   wherein the ADCs is configured to power off the fail memory boards in response to the second control signal.

7. The semiconductor test apparatus of claim 6, wherein if the determined test mode is the first test mode,
   the test management unit is configured to provide a first control signal, which is associated with power for the fail memory boards, to the interface board, and
   the interface board is configured to provide the second control signal to the ADCs in response to the first control signal.

8. The semiconductor test apparatus of claim 7, wherein each of the ADCs is connected to some of the fail memory boards,
   the interface board is configured to receive the first control signal from the test management unit and provide the second control signal to all the ADCs, and
   each of the ADCs is configured to power off all the fail memory boards connected thereto in response to the second control signal.

9. The semiconductor test apparatus of claim 1, further comprising:
   an interface board configured to provide a third control signal to the fail memory boards,
   wherein
   the test management unit is configured to provide a first control signal, which is for powering off the fail memory boards, to the interface board,
   the interface board is configured to provide the third control signal to the fail memory boards in response to the first control signal, and power for the fail memories mounted on each of the fail memory boards is configured to be cut off in response to the third control signal.

10. The semiconductor test apparatus of claim 9, wherein the interface board is configured to provide the third control signal to all the fail memory boards in response to the first control signal, and
power for all the fail memory boards that have received the third control signal is configured to be cut off.

11. A semiconductor test apparatus comprising:
a test management unit is configured to generate a test signal in accordance with a test program, transmit the test signal to fail memories, calculate an amount of input/output (I/O) usage in connection with the an execution of the test program, and determine whether to generate a first control signal based on the calculated amount of I/O usage; and
a plurality of fail memory boards including fail memory, which include fail signals generated as a result of a test conducted in accordance with the test signal and address information of the fail signals,
wherein the test management unit is further configured to cause some of the fail memory boards to be powered off when the first control signal is generated.

12. The semiconductor test apparatus of claim 11, wherein the test management unit is configured to automatically determine a number of fail memories for the test that is proportional to the amount of I/O usage, by calculating the amount of I/O usage.

13. The semiconductor test apparatus of claim 11, wherein the first control signal is associated with a number of fail memories for the test.

14. The semiconductor test apparatus of claim 11, further comprising:
one or more alternating current (AC)-to-direct current (DC) converters (ADCs) connected to the fail memory boards; and
an interface board is configured to provide a second control signal to the ADCs,
wherein the ADCs is configured to power off the fail memory boards in response to the second control signal.

15. The semiconductor test apparatus of claim 14, wherein
the test management unit is configured to provide the first control signal, which is associated with power for the fail memory boards, to the interface board, and
the interface board is configured to provide the second control signal to the ADCs in response to the first control signal.

16. The semiconductor test apparatus of claim 14, wherein
each of the ADCs is connected to some of the fail memory boards,
the interface board is configured receive the first control signal from the test management unit and provide the second control signal to some of the ADCs, and
each of the ADCs that have received the second control signal is configured to powers off all the fail memory boards connected thereto in response to the second control signal.

17. The semiconductor test apparatus of claim 14, wherein
the ADCs include first and second ADCs,
the first ADC is connected to one or more of the fail memory boards, and
the second ADC is connected to a number of fail memory boards that is same as, or different from, a number of fail memory boards connected to the first ADC.

18. The semiconductor test apparatus of claim 11, further comprising:
an interface board configured to provide a third control signal to the fail memory boards,
wherein
each of the fail memory boards is configured to receive a third control signal and cut off power for fail memory mounted thereon in response to the third control signal.

19. The semiconductor test apparatus of claim 18, wherein
the test management unit is configured to provides provide the first control signal, which is associated with power for the fail memory boards, to the interface board, and
the interface board is configured to receive the first control signal from the test management unit and provide the third control signal to the fail memory boards.

20. The semiconductor test apparatus of claim 18, wherein
the interface board is configured to receive the first control signal from the test management unit and provide the third control signal to some of the fail memory boards, and
power for the fail memory boards that have received the third control signal is configured to be cut off.

* * * * *